(12) United States Patent
Kuntz et al.

(10) Patent No.: US 7,083,834 B2
(45) Date of Patent: Aug. 1, 2006

(54) METHOD OF PREPARING AN ANISOTROPIC POLYMER FILM ON A SUBSTRATE WITH A STRUCTURED SURFACE

(75) Inventors: Matthias Kuntz, Seeheim-Jugenheim (DE); John Patrick, Poole (GB); Guy Gregory, Livingston (GB); Tony Bleasdale, Chorley (GB); Rodney Riddle, Poole (GB); Robert Hammond-Smith, Dammerham (GB); Peter Howarth, Moulton (GB); Allan Marshall, Hawkhurst (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/008,184

(22) Filed: Dec. 10, 2004

(65) Prior Publication Data
US 2005/0118355 A1 Jun. 2, 2005

Related U.S. Application Data

(62) Division of application No. 10/365,488, filed on Feb. 13, 2003, now abandoned.

(30) Foreign Application Priority Data
Feb. 13, 2002 (EP) .................................. 02003070

(51) Int. Cl.
C09K 19/52 (2006.01)
G02F 1/1337 (2006.01)

(52) U.S. Cl. ........................ 428/1.1; 428/1.3; 428/1.31; 428/1.2; 428/29; 428/916; 252/299.01

(58) Field of Classification Search .................. 349/94, 349/124, 123; 427/162, 163.1, 164, 290, 427/307, 372.2, 384, 385.5, 508, 510, 534; 428/1.1, 1.2, 1.3, 1.31, 29, 916; 252/299.01
See application file for complete search history.

(56) References Cited

U.S. PATENT DOCUMENTS

| 4,256,787 | A |   | 3/1981  | Smith et al. |        |
|-----------|---|---|---------|--------------|--------|
| 4,615,962 | A |   | 10/1986 | Garito        |        |
| 4,834,500 | A |   | 5/1989  | Hilsum et al  |        |
| 5,073,294 | A | * | 12/1991 | Shannon et al. | 252/299.01 |
| 5,438,421 | A |   | 8/1995  | Sugawara et al. | |
| 5,724,113 | A |   | 3/1998  | Bryan-Brown et al | |
| 5,754,264 | A |   | 5/1998  | Bryan-Brown et al | |
| 5,764,325 | A |   | 6/1998  | Bryan-Brown et al | |
| 5,823,654 | A | * | 10/1998 | Pastrick et al. | 362/494 |
| 5,853,801 | A |   | 12/1998 | Suga et al. | |
| 5,959,707 | A |   | 9/1999  | Murai et al. | |
| 5,995,184 | A |   | 11/1999 | Chung et al. | |
| 6,099,758 | A |   | 8/2000  | Verrall et al. | |
| 6,117,920 | A | * | 9/2000  | Jolliffe et al. | 522/170 |
| 6,217,948 | B1 |  | 4/2001  | Verrall et al. | |
| 6,271,906 | B1 |  | 8/2001  | Schwarz et al. | |
| 6,380,996 | B1 |  | 4/2002  | Yokoyama et al. | |
| 6,660,345 | B1 | * | 12/2003 | Coates et al. | 428/1.1 |
| 6,677,042 | B1 | * | 1/2004  | Kuntz et al. | 428/402 |
| 6,860,927 | B1 | * | 3/2005  | Kuntz et al. | 106/31.13 |
| 2001/0035520 | A1 |  | 11/2001 | Takeuchi et al. | |
| 2002/0001056 | A1 |  | 1/2002  | Sandberg et al. | |
| 2003/0067572 | A1 |  | 4/2003  | Umeda et al. | |

FOREIGN PATENT DOCUMENTS

| DE | 4405316     |   | 8/1995  |
|----|-------------|---|---------|
| DE | 19504224    |   | 8/1995  |
| DE | 4408171     |   | 9/1995  |
| EP | 0261712     |   | 3/1988  |
| EP | 0 297 764   |   | 1/1989  |
| EP | 0 971 016   |   | 1/2000  |
| GB | 2280445     |   | 2/1995  |
| GB | 2328207     |   | 2/1999  |
| GB | 2357061     | * | 6/2001  |
| WO | 93/22397    |   | 11/1993 |
| WO | 97/14990    |   | 4/1997  |
| WO | 98/00428    |   | 1/1998  |
| WO | WO 99/34251 |   | 7/1999  |

OTHER PUBLICATIONS

Search Report from EP Patent Office dated Dec. 3, 2004.
Martin Schadt, et al, "Surface-Induced Parallel Alignment of Liquid Crystals", Japanese Journal of Applled Physics. vol. 31, Part 1, No. 7, (1992), pp. 2155-2164.

* cited by examiner

*Primary Examiner*—Shean C Wu
(74) *Attorney, Agent, or Firm*—Millen, White, Zelano, Branigan, P.C.

(57) ABSTRACT

An anisotropic polymer film with improved alignments prepared by coating onto a substrate with a structured surface. The polymer films thereby obtained are useful in optical and electrooptical devices for decorative and security applications.

29 Claims, No Drawings

METHOD OF PREPARING AN ANISOTROPIC POLYMER FILM ON A SUBSTRATE WITH A STRUCTURED SURFACE

The instant application is a divisional of application Ser. No. 10/365,488, filed Feb. 13, 2003 now abandoned.

FIELD OF THE INVENTION

The invention relates to a method of preparing an anisotropic polymer film with improved alignment on a substrate with a structured surface, to polymer films thereby obtained and their use in optical and electrooptical devices, and for decorative and security applications.

BACKGROUND OF THE PRIOR ART

Anisotropic polymer films comprising a polymerized liquid crystal material with uniform orientation are known in prior art. They are usually prepared by coating a thin layer of a polymerizable liquid crystal mixture onto a substrate, aligning the mixture into uniform orientation and polymerizing the mixture.

For specific applications it is required to induce planar alignment in the liquid crystal layer, i.e., where the liquid crystal molecules are oriented substantially parallel to the layer. The alignment is then frozen in by polymerizing the liquid crystal mixture in situ. For example, oriented films or layers of polymerized nematic liquid crystal material with planar alignment are useful as A-plate compensators or polarizers. Another important application is oriented films or layers of polymerized cholesteric liquid crystal material having twisted molecular structure. If the cholesteric material has planar alignment, these films show selective reflection of light where the reflection colour is dependent on the viewing angle. They can be used, for example, as circular polarizers, colour filters or for the preparation of effect pigments for decorative or security applications. Furthermore, patterned films are known comprising regions of different orientation direction. These can be used in optical elements as mentioned above for decorative purposes or in security devices.

Planar alignment can be achieved, for example, by treatment of the substrate onto which the liquid crystal material is coated. The most usual method of surface treatment is to rub the substrate surface prior to application of the liquid crystal material. In case of rod-shaped liquid crystal molecules, these will align themselves with their long axes parallel to the rubbing direction. Alternatively, it is possible to apply an alignment layer, for example of polyimide, to the substrate, which can then subsequently be rubbed or which will induce the desired alignment. Other methods are the application of shear forces or the addition of surface active compounds to the liquid crystal material.

Reviews of conventional alignment techniques are given, for example, by I. Sage in "Thermotropic Liquid Crystals", edited by G. W. Gray, John Wiley & Sons, 1987, pages 75–77, and by T. Uchida and H. Seki in "Liquid Crystals—Applications and Uses Vol. 3", edited by B. Bahadur, World Scientific Publishing, Singapore 1992, pages 1–63. A review of alignment materials and techniques is given by J. Cognard, Mol. Cryst. Liq. Cryst. 78, Supplement 1 (1981), pages 1–77.

However, the methods of the prior art have several drawbacks. The use of alignment layers or additives in the liquid crystal material leads to increased costs. Rubbing of the substrate or the application of shear forces are usually carried out in one direction, so that the liquid crystal molecules will adopt planar alignment into one preferred direction over the entire film. The formation of patterned films comprising regions of different orientation is difficult with these methods.

Other methods to prepare patterned films known in prior art imply photoorientation or photoisomerisation of the liquid crystal material. However, this requires the additional use of photoisomerisable or photoorientating materials and of special techniques like photomasking or photopolymerisation under linearly polarised light.

Rubbing of a substrate also implies several drawbacks when used in mass production of liquid crystal polymer films. Therein, usually a flexible long film substrate is continuously unwound from a roll and rubbed directly before being coated with a polymerizable liquid crystal material, which is then polymerized and may be removed from the substrate. Whereas rubbing and thus alignment of the liquid crystal molecules can easily be achieved by conveying the substrate over a rubbing roller or between two rollers, alignment at any desired angle to the substrate moving direction requires more complicated rubbing stages, where the rollers can be positioned at an angle to the conveying direction of the substrate. Also, rubbing in a direction at right angles to the substrate conveying direction is not possible with this method.

An aim of the present invention is to provide a method of uniform alignment of liquid crystal material in the production of polymer films, wherein this method does not have the drawbacks of the prior art, allows alignment in any desired direction within the film plane and also the formation of patterned films, and is suitable for mass production and coating on a continuously conveying substrate. Other aims are directly evident to the expert from the following description.

The inventors have found that these aims can be achieved and the above drawbacks can be overcome by using a substrate with a structured surface, for example with a surface profile in the form of gratings or fine grooves. A polymerizable liquid crystal material coated onto the substrate will spontaneously align in the direction of the grating, and the alignment can then be fixed by polymerization. The surface profiles or gratings can be formed by known techniques, like for example embossing, photolithography, or interferography. The direction of the gratings can be freely chosen at any desired angle, and patterned structures may also be formed.

The use of substrates with a profiled or structured surface has been described in prior art for the alignment of low molar mass liquid crystals in switchable or thermochromic display devices. For example, U.S. Pat. No. 4,834,500 discloses a method of aligning a thermochromic cholesteric liquid crystal material between flexible walls having a surface that is profiled with a series of fine grooves and ridges, whereby the molecules of the cholesteric material are aligned substantially parallel to the wall. U.S. Pat. No. 5,724,113 describes a method to induce tilted alignment in a nematic, smectic or cholesteric liquid crystal cell by providing an alignment layer with an asymmetric surface grating onto the cell walls. U.S. Pat. No. 5,754,264 discloses a method of surface treatment to achieve a pretilt in a ferroelectric liquid crystal cell by providing symmetrical or asymmetrical monogratings to the surface of the cell walls. U.S. Pat. No. 5,764,325 discloses a method to achieve surface alignment and surface tilt in a twisted nematic liquid crystal cell by providing a grating of grooves with an asymmetric profile to the surface of the cell walls. WO 97/14990 and WO 99/34251 describe a bistable liquid crystal cell wherein the cell wall is provided with a surface alignment grating that permits the liquid crystal molecules to adopt two different pretilt angles.

However, these documents do not mention polymerizable liquid crystal materials or the formation of polymer films with uniform or patterned orientation in large scale production.

SUMMARY OF THE INVENTION

One object of the invention is to provide a method of preparing an anisotropic polymer film comprising a polymerized liquid crystal material with planar orientation, comprising the steps of coating a polymerizable liquid crystalline or mesogenic material onto a substrate with a structured surface, aligning the material, polymerizing the material and optionally removing the polymerized film from the substrate.

Another object of the invention is an anisotropic polymer film obtained by a method according to the present invention.

Another object of the invention is the use of an anisotropic polymer film according to the present invention in optical or electrooptical devices, for decorative or security applications.

Another object of the invention is a method of aligning a liquid crystalline or mesogenic material in a continuous coating process on a conveying substrate such that the molecules of the liquid crystalline or mesogenic material are oriented with their molecular long axes substantially parallel to the plane of the substrate and at any desired angle to the substrate moving direction, by using a substrate with a structured surface.

Another object of the invention is a security marking or device comprising a polymer film according to the present invention, and its application in hot stamping foils, laminates, labels, data carriers or documents of value like ID or credit cards, banknotes, security threads, cheques or CDs.

Upon further study of the specification and appended claims, further objects and advantages of this invention will become apparent to those skilled in the art.

Definition of Terms

The term 'substrate' as used in this application refers to any underlying layer or substrate.

The term 'film' as used in this application includes self-supporting, i.e., free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e., groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

DETAILED DESCRIPTION OF THE INVENTION

Preferably, the substrate surface onto which the polymerizable liquid crystal material is coated comprises an area of fine grooves or grating, by which the molecules of said polymerizable liquid crystal material are homogeneously aligned with their molecular long axes substantially parallel to the substrate surface and substantially parallel to the direction of said fine grooves or grating. In terms of substantially parallel, the difference in the direction of the molecular axis and the plane of the substrate surface and the direction of the axis of the grooves is preferably 0–10 degrees, very prepferably 0–2 degrees and especially 0–1 degrees.

The direction of the grooves or grating can be the same over the entire substrate. It is also possible that the substrate comprises different areas, or a specific pattern or image comprising different areas, having different directions of the grooves.

The grooves can have a symmetrical or asymmetrical profile. They can have, for example, a profile that is rectangular, square, saw tooth, triangular, trapezoidal, sine wave or an approximation to these profiles.

The grating or grooves have typical dimensions of a width of 0.2 to 2.0, preferably 0.8 to 1.2 µm, and a depth of 0.05 to 0.6, preferably 0.25 to 0.4 µm.

The substrate used for preparing the inventive film may comprise a carrier layer made of paper or polymers like for example, polypropylene, polyethylene terephthalate, triacetyl cellulose, or co-polymers thereof.

The substrate may be isotropic or anisotropic. For example, it is possible to use a birefringent substrate comprising a uniaxially or biaxially stretched or compressed film of the above mentioned materials.

The substrate may be removed from the polymerised liquid crystal material after polymerisation for example by using a release layer consisting of a mineral wax, natural wax, or other materials known in the art. Other release transfer methods may also be used.

The substrate may comprise of one or more additional layers on the surface of the carrier layer. These layers may be thermoplastic, thermosetting, or actinic radiation-curable materials, like for example, but not limited to, polyacrylate, vinyl polymer, polystyrene, polyamide, epoxy, or any copolymers thereof.

The polymerizable liquid crystal material coated on the substrate can be covered with a second substrate. The second substrate may have a structured surface or not. In case the second substrate has a structured surface with a fine grating, the dimensions, profile or direction of this may be different from or identical to the first substrate in selected areas or over the entire second substrate.

The grating can be provided to the substrate by any method known to those skilled in the art for this purpose, as described, for example, in U.S. Pat. No. 5,754,264 or in the references cited therein. Suitable methods are, for example, embossing, cast curing, or application of a profiled layer of a photopolymer formed by an interferographic or photolithographic process.

In a preferred embodiment of the present invention, a fine grating is prepared by embossing the substrate surface. This can be achieved by applying heat and pressure to the substrate in combination with a metal and preferably nickel shim micro-engraved with the desired image or pattern. These shims can also be made out of other materials.

Preferred embodiments of the invention relate to a method wherein the direction of the fine grooves or grating is substantially the same over the entire substrate.

the substrate comprises at least two areas having different direction of the fine grooves or grating.

the grooves or grating have a width of 0.2 to 2.0 µm and a depth of 0.05 to 0.6 µm.

the grooves or grating have a symmetrical profile.

the grooves or grating have an asymmetrical profile.

the grooves or grating have a profile that is rectangular, square, saw tooth, triangular, trapezoidal, sine wave or an approximation to these profiles.

the substrate comprises a carrier layer of a polymer or paper.

the substrate comprises a carrier layer in combination with one or more other layers containing thermoplastic, thermosetting, or actinic radiation-curable materials.

the structured surface of said substrate is formed by applying heat and pressure in combination with shims to the substrate.

the structured surface of said substrate is formed by interferography, photolithography, embossing, ion beam etching, electron beam etching, ruling or cast curing.

In another preferred embodiment the embossed film is prepared on a carrier film of, for example, polyester, polypropylene or polyethylene. Preferably, the carrier film is a polyester film, like, e.g., the commercially available Hostaphan® (Mitsubishi Polyester Film) or Melinex® (from Du Pont.). The carrier film thickness is typically in the range from 8 to 175 µm, depending on the use of the final anisotropic film.

In another preferred embodiment the embossed film is a hot stamping foil or comprises a part of a hot stamping foil.

In another preferred embodiment a reflective and opacifying layer is applied, for example, by vacuum deposition of a metal, preferably aluminium, onto the upper surface of the polymerizable liquid crystal layer, in a thickness of typically 100 to 500 Å, preferably 125 to 250 Å.

In a further preferred embodiment the reflective layer is added by laminating the polymerizable liquid crystal layer to a reflective layer, like for example the metal surface of a metallised polyester film, by means of, e.g., a pressure sensitive adhesive.

In a further preferred embodiment the reflective layer comprises one or more reflective pigments as a continuous layer or a printed design on another substrate.

In a further preferred embodiment of the present invention the anisotropic polymer film comprising the polymerized liquid crystal material is prepared by a continuous fabrication or manufacturing process. The continuous manufacturing process comprises at least one of the steps of embossing the substrate, coating, aligning and polymerizing the polymerizable liquid crystal material, applying additional layers like the embossable layer, release layer, reflective or opacifying layer or adhesive layer, and optionally removing one or both of the substrates. Preferably, at least the steps of coating, aligning and polymerizing the liquid crystal material, and optionally the steps of embossing the substrate and applying additional layers, are carried out in a continuous manufacturing process.

In a further preferred embodiment the layers containing the aligned polymerizable liquid crystal material are printed by a hot stamping process, and the carrier layer is removed. The hot stamping process is known in the art. The stamped films are especially useful for decorative or security purposes, like product or identification labels or security markings on documents of value like bank notes or ID cards.

The polymerizable liquid crystal material is preferably coated onto the structured surface of the substrate as a thin layer with a thickness of preferably 0.2 to 50 µm. The liquid crystal material can be applied by any suitable surface coating or printing technique that is known to the skilled in the art, like, for example, spin coating, gravure coating or printing, flexographic coating or printing, offset coating or printing or Meyer bar coating. The polymerizable liquid crystal material can also be dissolved in a solvent, preferably in an organic solvent. The solution is then coated onto the substrate, for example, by spin-coating or other known techniques, and the solvent is evaporated off. In most cases it is desirable to heat the mixture in order to facilitate the evaporation of the solvent.

The polymerizable liquid crystal material is preferably a nematic, smectic, chiral nematic (cholesteric) or chiral smectic material. Nematic materials are especially preferred. In case of a cholesteric material, preferably a substrate or surface comprising a light absorbing material, like a dark or black substrate, is used.

In another preferred embodiment the liquid crystal material is a nematic liquid crystal material, preferably with a pattern of at least two areas having different alignment directions. Such a film is transparent when viewed at normal conditions, but shows a pattern of interference colours when viewed through a linear polariser against a reflective background or when viewed between two polarisers.

The above embodiments are particularly suitable for use as false-proof security markings on banknotes or documents of value, by which the document is easy to authenticate when viewed through one polariser against a dark or reflective background or when viewed between two polarisers.

The liquid crystal material of the anisotropic polymer film is preferably a polymerizable or crosslinkable material that is polymerised or crosslinked during or after evaporation of the solvent. It preferably comprises at least one polymerisable mesogenic compound having one polymerisable functional group and at least one polymerisable mesogenic compound having two or more polymerisable functional groups.

If the polymerisable LC material comprises polymerisable mesogenic compounds having two or more polymerisable functional groups (di- or multireactive or di-or multifunctional compounds), upon polymerisation a three-dimensional polymer network is formed, which is self-supporting and shows a high mechanical and thermal stability and a low temperature dependence of its physical and optical properties. By varying the concentration of the multifunctional mesogenic or non mesogenic compounds the crosslink density of the polymer film and thereby its physical and chemical properties such as the glass transition temperature, which is also important for the temperature dependence of the optical properties of the polymerised film, the thermal and mechanical stability or the solvent resistance can be tuned easily.

The polymerisable mesogenic mono-, di- or multireactive compounds can be prepared by methods.-which are known per se and which are described, for example, in standard works of organic chemistry such as, for example, Houben-Weyl, Methoden der organischen Chemie, Thieme-Verlag, Stuttgart. Typical examples are described, for example, in WO 93/22397; EP 0 261 712; DE 19504224; DE 4408171 and DE 4405316. The compounds disclosed in these documents, however, are to be regarded merely as examples that do not limit the scope of this invention.

Examples representing especially useful monoreactive polymerisable mesogenic compounds are shown in the following list of compounds, which should, however, be taken only as illustrative and is in no way intended to restrict, but instead to explain the present invention:

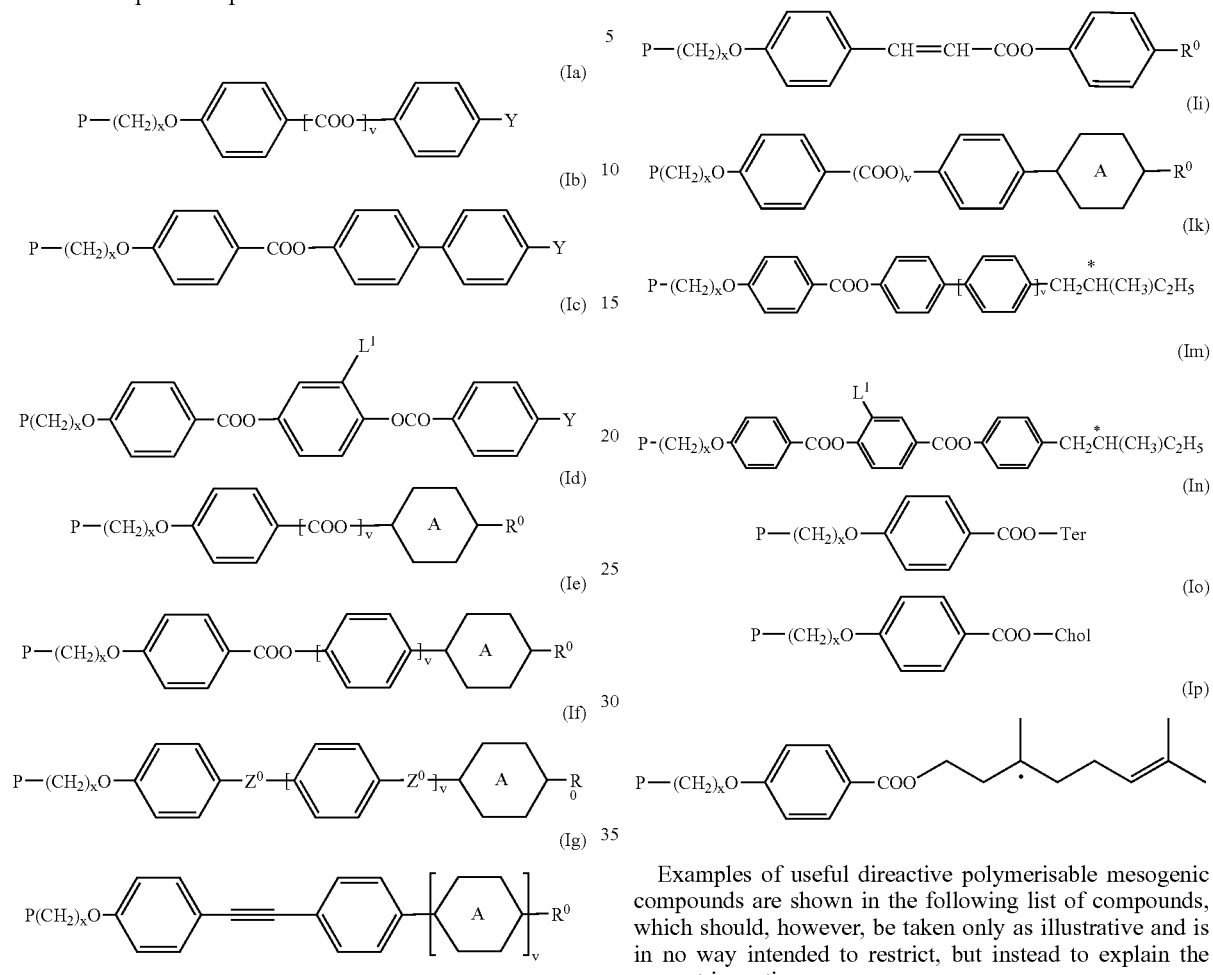

Examples of useful direactive polymerisable mesogenic compounds are shown in the following list of compounds, which should, however, be taken only as illustrative and is in no way intended to restrict, but instead to explain the present invention

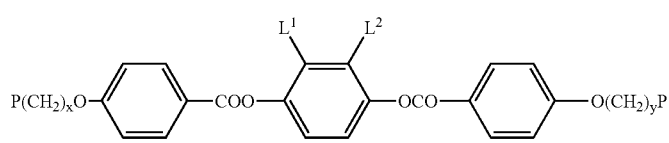

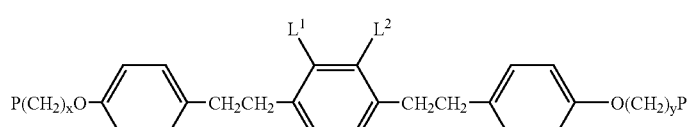

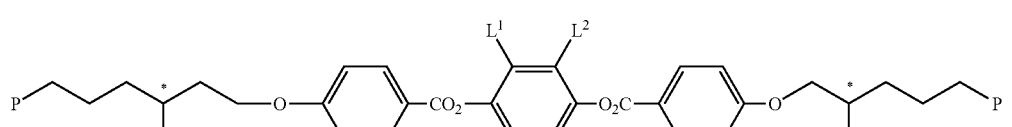

-continued

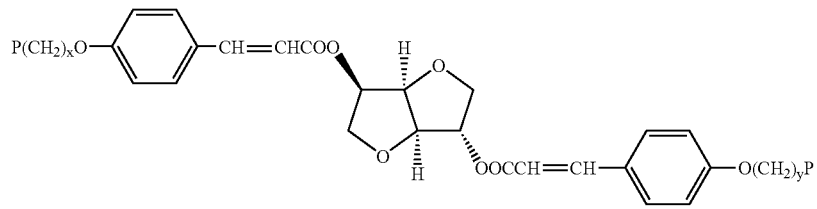
(IId)

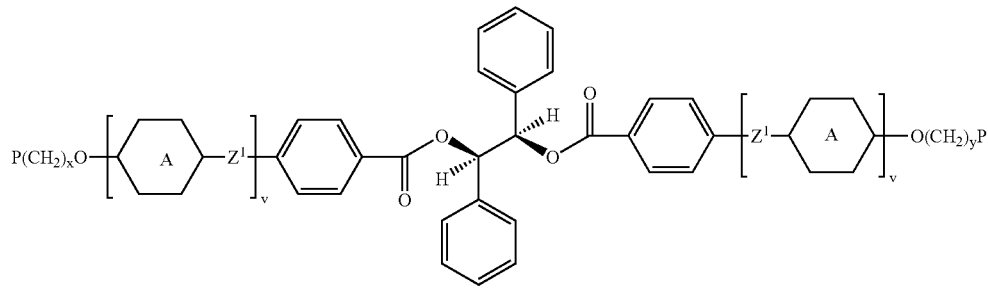
(IIe)

In the above formulae, P is a polymerisable group, preferably an acryl, methacryl, vinyl, vinyloxy, propenyl ether, epoxy or styryl group, x and y are each independently 1 to 12, A is 1,4-phenylene that is optionally mono- di or trisubstituted by $L^1$ or is 1,4-cyclohexylene, v is 0 or 1, $Z^0$ is —COO—, —OCO—, —CH$_2$CH$_2$— or a single bond, Y is a polar group, Ter is a terpenoid radical like, e.g., menthyl, Chol is a cholesteryl group, $R^0$ is a nonpolar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. The term 'nonpolar group' means an alkyl group with 1 or more, preferably 1 to 12 C atoms or an alkoxy group with 2 or more, preferably 2 to 12 C atoms.

In case CLC materials are used, these preferably comprise a nematic or smectic host material and one or more chiral dopants that induce a helical twist in the host material. The chiral dopants can be polymerisable or not. They can be mesogenic or liquid crystal compounds, but do not necessarily have to be liquid crystalline.

Especially preferred are chiral dopants with a high helical twisting power (HTP), in particular as disclosed in WO 98/00428. Further typically used chiral dopants are, e.g., the commercially available S 1011, R 811 or CB 15 (from Merck KGBA, Darmstadt, Germany).

Very preferred are chiral dopants selected from the following formulae

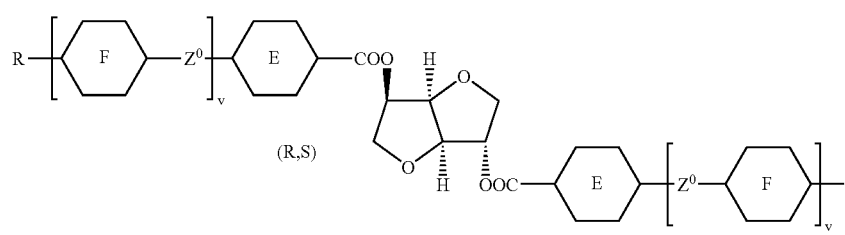
II

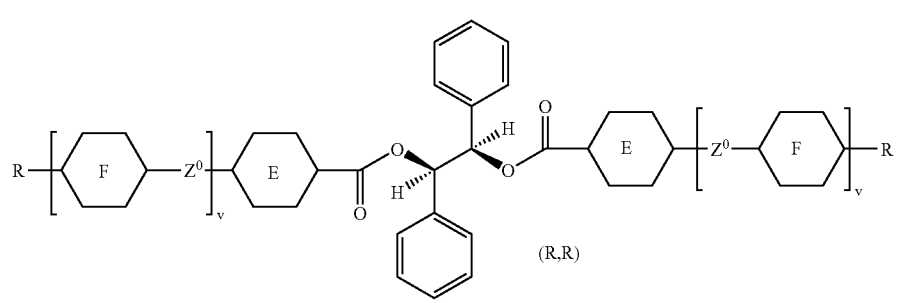
III including the (R,S), (S,R), (R,R) and (S,S) enantiomers not shown, wherein E and F have each independently one of the meanings of A given above, v is 0 or 1, $Z^0$ is —COO—, —OCO—, —CH$_2$CH$_2$— or a single bond, and R is alkyl, alkoxy, carbonyl or carbonyloxy with 1 to 12 C atoms.

The compounds of formula II are described in WO 98/00428, the compounds of formula III synthesis are described in GB 2,328,207, the entire disclosure of which is incorporated into this application by reference.

Polymerisable chiral compounds are preferably selected from the above formulae Ik to Ip, and IIc to IIe. It is also possible to use compounds of formula Ia to Ii wherein Ro or Y comprise a chiral C atom.

The amount of chiral dopants in the liquid crystal material is preferably less than 15%, in particular less than 10%, very preferably less than 5% by weight of the total LC material (without the solvent).

Polymerisation of the polymerisable liquid crystal material takes place by exposing it to heat or actinic radiation. Actinic radiation means irradiation with light, like UV light, IR light or visible light, irradiation with X-rays or gamma rays or irradiation with high energy particles, such as ions or electrons. Preferably, polymerisation is carried out by UV irradiation. As a source for actinic radiation for example a single UV lamp or a set of UV lamps can be used. When using a high lamp power the curing time can be reduced. Another possible source for actinic radiation is a laser, like, e.g., a UV laser, an IR laser or a visible laser.

The polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or. methacrylate groups, preferably a radical photoinitiator is used, when curing polymerisable mesogens vinyl and epoxide groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651®, Irgacure 184®, Darocur 1173® or Darocur 4205® (all from Ciba Geigy AG) can be used, whereas in case of cationic photopolymerisation the commercially available UVI 6974® (Union Carbide) can be used. The polymerisable LC material preferably comprises 0.01 to 10%, very preferably 0.05 to 5%, in particular 0.1 to 3% of a polymerisation initiator. UV photoinitiators are preferred, in particular radicalic UV photoinitiators.

The curing time is dependant, inter alia, on the reactivity of the polymerisable mesogenic material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For continuous production short curing times of 3 minutes or less, very preferably of 1 minute or less, in particular of 30 seconds or less, are preferred.

The polymerisable liquid crystal material can additionally comprise one or more other suitable components such as, for example, catalysts, sensitisers, stabilisers, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

In particular, the addition of stabilisers is preferred in order to prevent undesired spontaneous polymerisation of the polymerisable material for example during storage. As stabilisers in principal all compounds can be used that are known to the skilled in the art for this purpose. These compounds are commercially available in a broad variety. Typical examples for stabilisers are 4-ethoxyphenol or butylated hydroxytoluene (BHT).

Other additives, like, e.g., chain transfer agents, can also be added to the polymerisable material in order to modify the physical properties of the resulting polymer film. When adding a chain transfer agent, such as monofunctional thiol compounds like, e.g., dodecane thiol or multifunctional thiol compounds like, e.g., trimethylolpropane tri(3-mercaptopropionate), to the polymerisable material, the length of the free polymer chains and/or the length of the polymer chains between two crosslinks in the inventive polymer film can be controlled. When the amount of the chain transfer agent is increased, the polymer chain length in the obtained polymer film is decreased.

It is also possible, in order to increase crosslinking of the polymers, to add up to 20% of a non mesogenic compound with two or more polymerisable functional groups to the polymerisable material alternatively or in addition to the di- or multifunctional polymerisable mesogenic compounds to increase crosslinking of the polymer. Typical examples for difunctional non-mesogenic monomers are alkyldiacrylates or alkyldimethacrylates with alkyl groups of 1 to 20 C atoms. Typical examples for non-mesogenic monomers with more than two polymerisable groups are trimethylolpropane trimethacrylate or pentaerythritol tetraacrylate.

In another preferred embodiment the mixture of polymerisable material comprises up to 70%, preferably 3 to 50% of a non-mesogenic compound with one polymerisable functional group. Typical examples for monofunctional non-mesogenic monomers are alkylacrylates or alkylmethacrylates.

It is also possible to add, for example, a quantity of up to 20% by weight of a non-polymerisable liquid-crystalline compound to adapt the optical properties of the resulting polymer film.

The polymerisation is preferably carried out in the liquid crystal phase of the polymerisable material. Therefore, preferably polymerisable mesogenic compounds or mixtures with low melting points and broad liquid crystal phase ranges are used. The use of such materials allows a reduction of the polymerisation temperature, which makes the polymerisation process easier and is a considerable advantage especially for continuous production. The selection of suitable polymerisation temperatures depends mainly on the clearing point of the polymerisable material and, inter alia, on the softening point of the substrate. Preferably, the polymerisation temperature is at least 30 degrees below the clearing temperature of the polymerisable mesogenic mixture. Polymerisation temperatures below 120° C. are preferred. Especially preferred are temperatures below 90° C., in particular temperatures of 60° C. or less.

The anisotropic layer obtained by the inventive process can be used in optical elements, like reflective polarisers, retardation films, compensators, colour filters or holographic elements, especially in reflective films with patterned optical properties, in adhesives, synthetic resins with anisotropic mechanical properties, for the preparation of liquid crystal pigments, in decorative and security applications, especially in security markings that are applied to items or documents of value for easy identification or prevention of falsification, in nonlinear optics, optical recording or information storage.

The anisotropic polymer film according to the present invention is especially useful as security marking for identification and prevention of copying or counterfeiting of high value documents like ID cards, bank notes, share certificates, etc. The anisotropic polymer film can be either included in a laminate or adhesively bound to the surface of the document or as a transparent or watermark area.

Without further elaboration, it is believed that one skilled in the art can, using the preceding description, utilise the present invention to its fullest extent. The following examples are, therefore, to be construed as merely illustrative and not limited by the remainder of the disclosure in any way whatsoever.

In the foregoing and in the following examples, unless otherwise indicated, all temperatures are set forth uncorrected in degrees Celsius and all parts and percentages are by weight.

The entire disclosure of all applications, patents and publications, cited above and below, and of corresponding European Application No. 02003070.6, filed Feb. 13, 2002 is hereby incorporated by reference.

EXAMPLES

Example 1

The following polymerisable mixture is formulated

| Toluene | 70.0% |
| compound A | 6.9% |
| compound B | 3.6% |
| compound C | 9.1% |
| compound D | 8.5% |
| Fluorad FC-171 ® | 0.1% |
| Irgacure 907 ® | 1.8% |

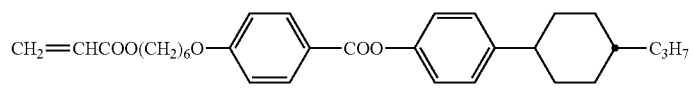

(A)

(B)

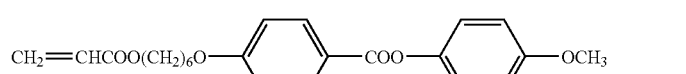

(C)

(D)

Compound (A) and its preparation are described in GB 2,280,445. Compounds (B), (C) and (D) can be prepared according to or in analogy to the methods described in D. J. Broer et al., Makromol.Chem. 190, 3201–3215 (1989). Irgacure 907 is a commercially available photoinitiator (Ciba Geigy). Fluorad FC 171 is a commercially available surfactant (3M).

This solution is coated on to an embossed film, where the embossing is in a single direction, using for example a wire wound bar to give a 6 micron wet film. This coating is then dried at 60° C. for one minute and cured by exposing to the light from a medium pressure mercury lamp for one minute. When viewed through a linear polariser against a reflective background a dark blue colour is seen.

Example 2

The solution of Example 1 is coated on to an embossed film where the embossing is in domains having differing directions using a wire wound bar to give a 6 micron wet film. This coating is then dried at 60° C. for one minute and cured by exposure to the light from a medium pressure mercury lamp for one minute. When viewed through a rotating linear polariser against a reflective background a dark blue colour is seen only in regions having the appropriate alignment.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various conditions and usages.

The invention claimed is:

1. A security marking or device comprising an anisotropic polymer film obtainable by a process comprising:
coating a polymerizable liquid crystalline or mesogenic material onto a substrate with a structured surface,
aligning the polymerizable liquid crystalline or mesogenic material, polymerizing the polymerizable liquid crystalline or mesogenic material to form a polymer film, optionally removing the polymerized film from the substrate, and applying a reflective layer onto the upper surface of the liquid crystalline or mesogenic material polymer film, wherein the structured substrate surface comprises at least two areas of fine grooves or grating by which the molecules of said polymerizable liquid crystal or mesogenic material are homogeneously aligned with their molecular long axes substantially parallel to the substrate surface and substantially parallel to the direction of said fine grooves or grating, and said at least two areas have different direction of the fine grooves or grating, and wherein the liquid crystalline or mesogenic material polymer film has a pattern of at least two areas having different alignments.

2. A security marking or device according to claim 1, wherein said grooves or grating have a width of 0.2 to 2.0 µm and a depth of 0.05 to 0.6 µm.

3. A security marking or device according to claim 1, wherein said grooves or grating have a symmetrical profile.

4. A security marking or device according to claim 1, wherein said grooves or grating have an asymmetrical profile.

5. A security marking or device according to claim 1, wherein said grooves or grating have a profile that is rectangular, square, saw tooth, triangular, trapezoidal, sine wave or an approximation to these profiles.

6. A security marking or device according to claim 1, wherein the substrate comprises a carrier layer.

7. A security marking or device according to claim 6, wherein the substrate comprises one or more additional layers on the carrier layer.

8. A security marking or device according to claim 1, wherein the structured surface of said substrate is formed by applying heat and pressure in combination with micro-engraved shims to the substrate.

9. A security marking or device according to claim 1, wherein the structured surface of said substrate is formed by interferography, photolithography, embossing, ion beam etching, electron beam etching, ruling or cast curing.

10. An anisotropic polymer film with planar alignment obtained by a process comprising:

coating a polymerizable liquid crystalline or mesogenic material onto a substrate with a structured surface, aligning the polymerizable liquid crystalline or mesogenic material, polymerizing the polymerizable liquid crystalline or mesogenic material to form a polymer film, optionally removing the polymerized film from the substrate, and applying a reflective layer is onto the upper surface of the liquid crystalline or mesogenic material polymer film, wherein the structured substrate surface comprises at least two areas of fine grooves or grating, by which the molecules of said polymerizable liquid crystal or mesogenic material are homogeneously aligned with their molecular long axes substantially parallel to the substrate surface and substantially parallel to the direction of said fine grooves or grating, and said at least two areas have different direction of the fine grooves or grating, and wherein the liquid crystalline or mesogenic material polymer film has a pattern of at least two areas having different alignments.

11. In a hot stamping foil, laminate, label, data carrier, document of value, ID or credit card, banknote, security thread, check or CD comprising a security marking or device, the improvement wherein said security marking or device is according to claim 1.

12. A security marking or device comprising an anisotropic polymer film obtainable by a process comprising:

applying a liquid crystalline or mesogenic material in a continuous coating process onto a conveying substrate with a structured surface, whereby the molecular long axes of the molecules of the liquid crystalline or mesogenic material are aligned to be substantially parallel to the plane of the substrate and at any desired angle to the substrate moving direction, polymerizing the polymerizable liquid crystalline or mesogenic material to form a polymer film, optionally removing the polymerized film from the substrate, and applying a reflective layer is onto the upper surface of the liquid crystalline or mesogenic material polymer film, wherein the structured substrate surface comprises at least two areas of fine grooves or grating, by which the molecules of said polymerizable liquid crystal or inesogenic material are homogeneously aligned with their molecular long axes substantially parallel to the substrate surface and substantially parallel to the direction of said fine grooves or grating, and said at least two areas have different direction of fine grooves or grating, and wherein the liquid crystalline or mesogenic material polymer film has a pattern of at least two areas having different alignments.

13. A security marking or device according to claim 12, wherein the film is embossed and is prepared on a carrier.

14. A security marking or device according to claim 12, wherein the film is embossed and is a hot stamping foil or a part of a hot stamping foil.

15. A security marking or device according to claim 1, wherein the reflective layer is a metal or metallized film, or a metal layer that is deposited on the liquid crystal layer.

16. A security marking or device according to claim 6, wherein said carrier layer is made of paper or polymers selected from polypropylene, polyethylene terephthalate, triacetyl cellulose, and co-polymers thereof.

17. A security marking or device according to claim 7, wherein said one or more additional layers on the surface of the carrier layer are made of thermoplastic, thermosetting, or actinic radiation-curable materials selected from polyacrylates, vinyl polymers, polystyrenes, polyamides, epoxies, and copolymers thereof.

18. A security marking or device according to claim 1, wherein the difference in the direction of the molecular long axes of said polymerizable liquid crystal or mesogenic material and plane of the substrate surface is 0–2 degrees, and the difference in the direction of the molecular long axes of said polymerizable liquid crystal or mesogenic material and the direction of said fine grooves or grating is 0–2 degrees.

19. A security marking or device according to claim 1, wherein said grooves or grating have a width of 0.8 to 1.2 µm and a depth of 0.25 to 0.4 µm.

20. A security marking or device according to claim 5, wherein said grooves or grating have a profile that is rectangular, square, or trapezoidal.

21. A security marking or device according to claim 5, wherein said grooves or grating have a profile that is saw tooth or triangular.

22. A security marking or device according to claim 5, wherein said grooves or grating have a profile that is sine wave.

23. A security marking or device according to claim 1, wherein said reflective layer has a thickness of 100 to 500 Å.

24. A security marking or device according to claim 1, wherein said reflective layer has a thickness of 125 to 250 Å.

25. A security marking or device according to claim 1, wherein the polymerizable liquid crystal or mesogenic material is coated onto the structured surface of the substrate as a layer with a thickness of 0.2 to 50 μm.

26. A security marking or device according to claim 1, wherein the polymerizable liquid crystal or mesogenic material is a nematic liquid crystal material.

27. A security marking or device according to claim 1, wherein the polymerizable liquid crystal or mesogenic material is a polymerizable liquid crystal material comprising at least one polymerisable mesogenic compound having one polymerisable functional group and at least one polymerisable mesogenic compound having two or more polymerisable functional groups.

28. A security marking or device according to claim 27, wherein said at least one polymerisable mesogenic compound having one polymerisable functional group is selected from the following compounds:

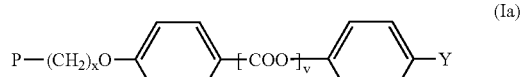
(Ia)

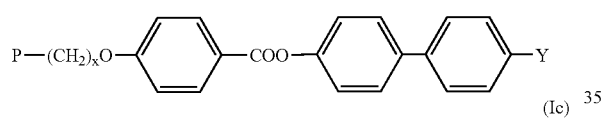
(Ib)

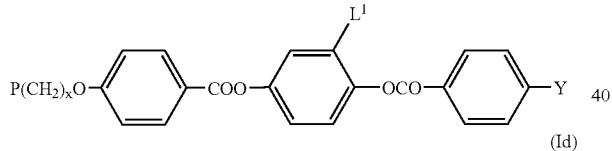
(Ic)

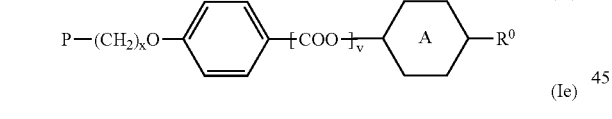
(Id)

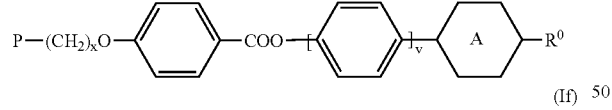
(Ie)

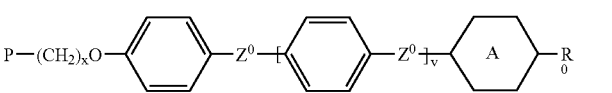
(If)

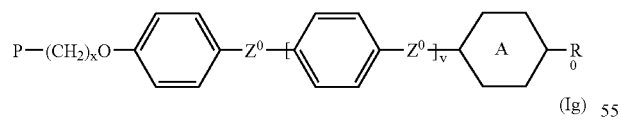
(Ig)

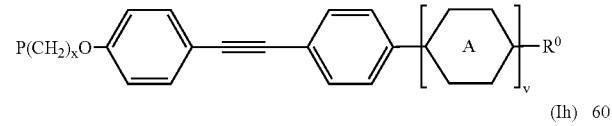
(Ih)

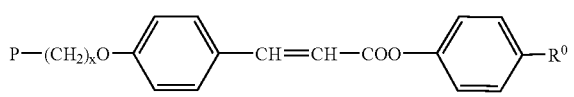

-continued

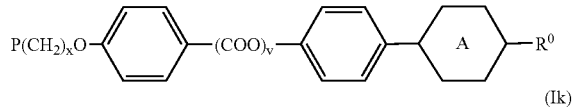
(Ii)

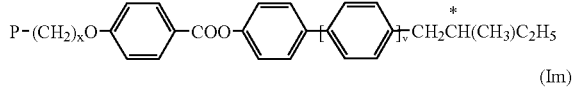
(Ik)

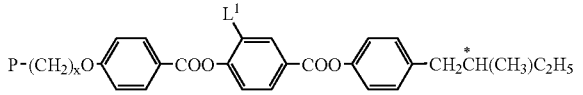
(Im)

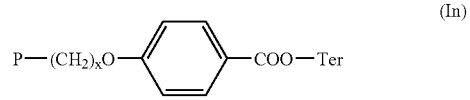
(In)

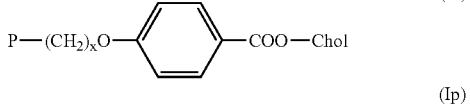
(Io)

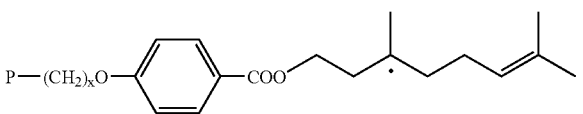
(Ip)

wherein
P is an acryl, methacryl, vinyl, vinyloxy, propenyl ether, epoxy or styryl group, x and y are each independently 1 to 12,
A is 1,4-phenylene that is optionally mono-, di- or trisubstituted by $L^1$ or 1,4-cyclohexylene, v is 0 or 1,
$Z^0$ is —COO—, —OCO—, —CH$_2$CH$_2$— or a single bond,
Y is F, Cl, CN, NO$_2$, OH, OCH$_3$, OCN, SCN, an optionally fluorinated carbonyl or carboxyl group with up to 4 C atoms, or a mono- oligo- or polyfluorinated alkyl or alkoxy group with 1 to 4 C atoms,
Ter is a terpenoid radical,
Chol is a cholesteryl group,
$R^0$ is an alkyl group with 1 to 12 C atoms or an alkoxy group with 2 to 12 C atoms, and
$L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

29. An anisotropic polymer film obtainable by a process comprising:
a polymerized film of polymerizable liquid crystalline or mesogenic material, and
a reflective layer on the upper surface of the polymerized film,
wherein the molecules of the film of polymerizable liquid crystal material or mesogenic material are homogeneously aligned with their molecular long axes substantially planar and the liquid crystalline or mesogenic material polymer film has a pattern of at least two areas having different alignments.

* * * * *

UNITED STATES PATENT AND TRADEMARK OFFICE
CERTIFICATE OF CORRECTION

PATENT NO. : 7,083,834 B2 Page 1 of 1
APPLICATION NO. : 11/008184
DATED : August 1, 2006
INVENTOR(S) : Tony Bleasdale It is certified that error appears in the above-identified patent and that said Letters Patent is hereby corrected as shown below:

Column 15, line 54, reads "layer is onto" should read -- layer onto --
Column 16, line 24, reads "inesogenic" should read -- mesogenic --
Column 17, line 18, reads "polymerisable" should read -- polymerizable --
Column 17, line 19, reads "polymerisable" should read -- polymerizable --
Column 17, line 19-20, reads "polymerisable" should read -- polymerizable --
Column 17, line 20, reads "polymerisable" should read -- polymerizable --
Column 17, line 23, reads "polymerisable" should read -- polymerizable --
Column 17, line 24, reads "polymerisable" should read -- polymerizable --
Column 17, line 53, reads

"  "

should read --  --

Column 18, line 32, start new line at "x and y"
Column 18, line 35, start new line at "v is"
Column 18, line 41, reads "mono- oligo-" should read -- mono-, oligo- --

Signed and Sealed this

Nineteenth Day of August, 2008

JON W. DUDAS
*Director of the United States Patent and Trademark Office*